(12) United States Patent
Amaya

(10) Patent No.: US 12,619,572 B2
(45) Date of Patent: May 5, 2026

(54) PROTOCOL DETERMINATION CIRCUIT AND PROTOCOL SWITCHING CIRCUIT

(71) Applicant: Mitsubishi Electric Corporation, Tokyo (JP)

(72) Inventor: Hideyuki Amaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/713,028

(22) PCT Filed: Sep. 5, 2022

(86) PCT No.: PCT/JP2022/033269
§ 371 (c)(1),
(2) Date: May 23, 2024

(87) PCT Pub. No.: WO2023/105865
PCT Pub. Date: Jun. 15, 2023

(65) Prior Publication Data
US 2025/0013598 A1    Jan. 9, 2025

(30) Foreign Application Priority Data
Dec. 6, 2021    (JP) ................................. 2021-197721

(51) Int. Cl.
*G06F 13/42*        (2006.01)
(52) U.S. Cl.
CPC .. *G06F 13/4282* (2013.01); *G06F 2213/0016* (2013.01)
(58) Field of Classification Search
None
See application file for complete search history.

(56) References Cited

U.S. PATENT DOCUMENTS 7,690,570 B2 *    4/2010    Fruhauf ........... G06K 19/07733
235/492
2002/0108011 A1 *    8/2002    Tanha ................. G06F 13/4291
710/306
(Continued)

FOREIGN PATENT DOCUMENTS

CN        112804128 B        7/2021
JP        S63250759 A        10/1988
(Continued)

OTHER PUBLICATIONS

Notice of Reasons for Refusal dated Apr. 15, 2025, issued in the corresponding Japanese Patent Application No. 2023-566092, 7 pages including 3 pages of English Translation.
(Continued)

*Primary Examiner* — Henry Tsai
*Assistant Examiner* — Dean Phan
(74) *Attorney, Agent, or Firm* — Buchanan Ingersoll & Rooney PC

(57)        ABSTRACT
Noise immunity of a protocol determination circuit that determines a communication protocol between circuits is improved. A protocol determination circuit includes: a sampling circuit; and a majority decision circuit. The sampling circuit performs a plurality of number of times of sampling on a protocol specifying signal, the protocol specifying signal being any one of a value indicating a first communication protocol I2C and a value indicating a second communication protocol SPI. The majority decision circuit outputs a majority decision signal, the majority decision signal indicating a communication protocol corresponding to a value sampled majority number of times in the plurality of number of times of sampling.

8 Claims, 9 Drawing Sheets

(56)                References Cited

U.S. PATENT DOCUMENTS

2015/0363353  A1*  12/2015  Enami ....................... G06F 1/08
                                                               710/110
2018/0143917  A1     5/2018  Flachs et al.
2020/0293265  A1*    9/2020  Chen ....................... G06F 3/162

FOREIGN PATENT DOCUMENTS

JP          2002232508  A      8/2002
JP          2005167663  A      6/2005
JP          2013058868  A      3/2013
JP          2016218943  A     12/2016
JP          2018085104  A      5/2018

OTHER PUBLICATIONS

International Search Report (PCT/ISA/210) with translation and
Written Opinion (PCT/ISA/237) mailed Nov. 22, 2022, by the Japan
Patent Office as the International Searching Authority for Interna-
tional Application No. PCT/JP2022/033269. (9 pages).

* cited by examiner

PROTOCOL DETERMINATION CIRCUIT AND PROTOCOL SWITCHING CIRCUIT

TECHNICAL FIELD

The present disclosure relates to a protocol determination circuit that determines a communication protocol between circuits, and a protocol switching circuit including the protocol determination circuit.

BACKGROUND ART

A configuration that determines a communication protocol between circuits has been conventionally known. For example, Japanese Patent Laying-Open No. 63-250759 (PTL 1) discloses an integrated circuit device that switches a communication mode between an Inter-Integrated Circuit (I2C) mode and a Serial Peripheral Interface (SPI) mode. In the integrated circuit device, the I2C mode is selected in an initial state after power on reset. When a clock input signal is High at the falling (timing of switching from High to Low) of a chip select signal, the SPI mode is selected and the communication operation is performed. When communication is started without the falling of the chip select signal, the communication operation is performed in the I2C mode that is the initial state. When a data input signal rises (changes from Low to High) in the I2C mode and a stop condition in which the clock input signal is High is satisfied, or when the rising occurs in the chip select signal in the SPI mode, it is determined that a communication end condition is satisfied, and the communication mode is returned to the I2C mode that is the initial state.

CITATION LIST

Patent Literature

PTL 1: Japanese Patent Laying-Open No. 63-250759

SUMMARY OF INVENTION

Technical Problem

Usually, in I2C communication, a communication mode switching process is performed based on the premise that a chip select signal does not change, and in SPI communication, a communication mode switching process is performed based on the premise that a clock signal is High at the falling of a chip select signal. Therefore, in the integrated circuit device disclosed in PTL 1, when the chip select signal changes in the I2C mode, or when the clock signal is switched to Low at the falling of the chip select signal in the SPI mode, a protocol determination process is not appropriately performed and communication may become impossible due to superimposition of noise.

The present disclosure has been made to solve the above-described problem, and an object thereof is to improve noise immunity of a protocol determination circuit that determines a communication protocol between circuits.

Solution to Problem

A protocol determination circuit according to the present disclosure includes: a sampling circuit; and a majority decision circuit. The sampling circuit performs a plurality of number of times of sampling on a protocol specifying signal, the protocol specifying signal being any one of a value indicating a first communication protocol and a value indicating a second communication protocol. The majority decision circuit outputs a majority decision signal, the majority decision signal indicating a communication protocol corresponding to a value sampled majority number of times in the plurality of number of times of sampling.

Advantageous Effects of Invention

The protocol determination circuit according to the present disclosure makes it possible to improve noise immunity of the protocol determination circuit that determines a communication protocol between circuits, by using the majority decision signal based on the plurality of number of times of sampling on the protocol specifying signal.

DESCRIPTION OF EMBODIMENTS

Figure 1:
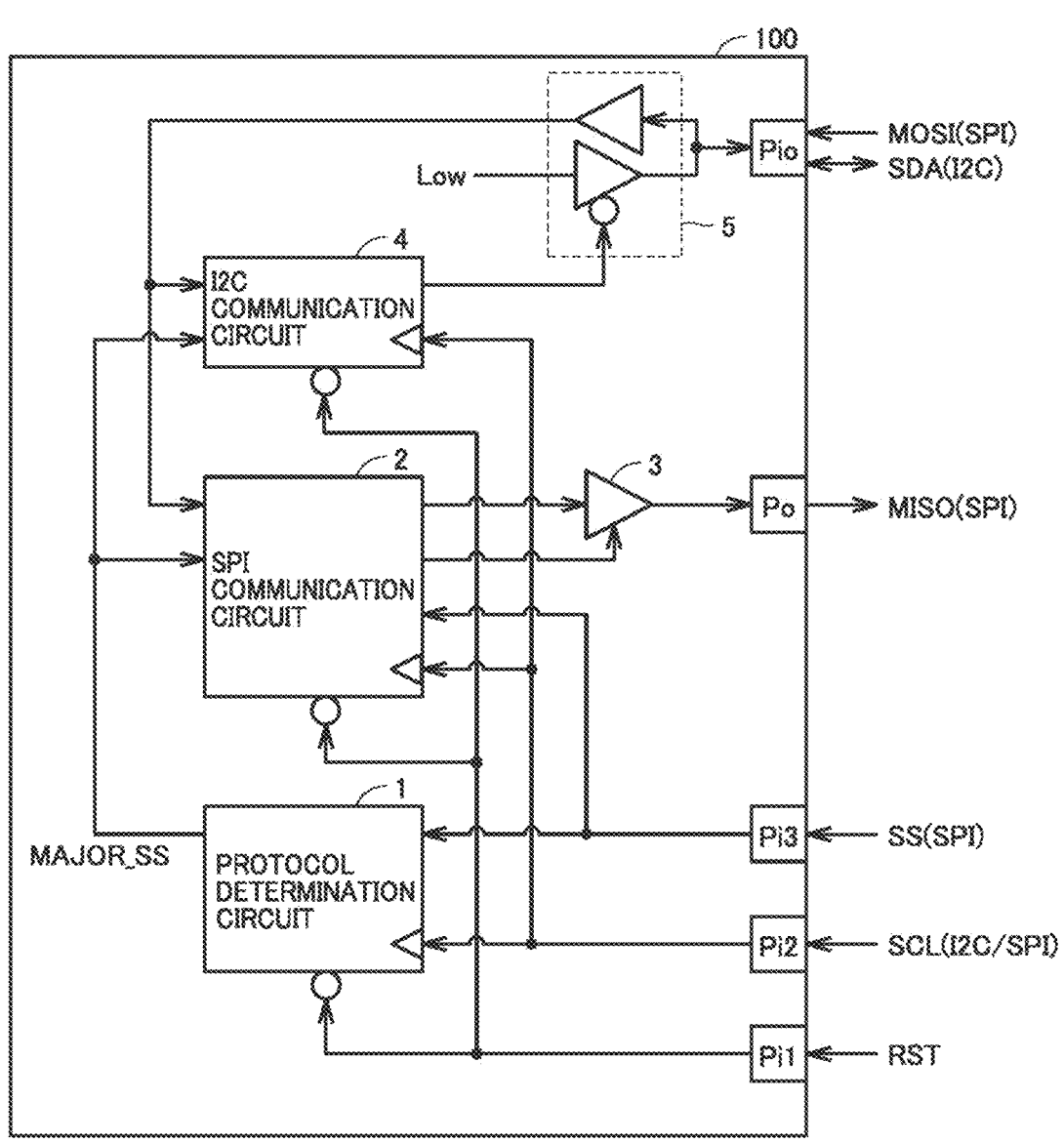
FIG. 1 is a block diagram showing a configuration example of a protocol switching circuit according to a first embodiment.

Hereinafter, embodiments of the present disclosure will be described in detail with reference to the drawings, in which the same or corresponding portions are denoted by the same reference characters and description thereof will not be repeated in principle.

First Embodiment

FIG. 1 is a block diagram showing a configuration example of a protocol switching circuit 100 according to a first embodiment. As shown in FIG. 1, protocol switching circuit 100 includes input terminals Pi1, Pi2 and Pi3, an output terminal Po, an input/output terminal Pio, a protocol determination circuit 1, an SPI communication circuit 2, a tri-state buffer 3, an I2C communication circuit 4, and a bidirectional buffer 5. Hereinafter, protocol determination circuit 1, SPI communication circuit 2 and I2C communication circuit 4 will also be collectively referred to as "internal circuit".

Input terminal Pi1 receives a reset signal RST. Reset signal RST initializes the internal circuit. Input terminal Pi2 receives a serial clock signal SCL in I2C (first communication protocol) and SPI (second communication protocol). Serial clock signal SCL is a clock signal referred to during operation of the internal circuit. Input terminal Pi3 receives a chip select signal SS (protocol specifying signal) indicating a slave selected in the SPI. Chip select signal SS is set to inactive logic (first value) in I2C communication, and is set to active logic (second value) in SPI communication. In chip select signal SS, the active logic is Low or 0, and the inactive logic is High or 1.

Output terminal Po outputs a master-in slave-out signal MISO from a slave to a master in the SPI. Master-in slave-out signal MISO has a high impedance in I2C communication. Input/output terminal Pio receives a master-out slave-in signal MOSI from a master to a slave in the SPI. Input/output terminal Pio receives and outputs a serial data signal SDA in the I2C.

Protocol determination circuit 1 receives reset signal RST from input terminal Pi1, receives serial clock signal SCL from input terminal Pi2, and receives chip select signal SS from input terminal Pi3. In first communication after reset signal RST is cleared (changes from Low to High), protocol determination circuit 1 performs sampling on chip select signal SS at a plurality of number of times (e.g., odd number of times equal to or more than three times) of rising of serial clock signal SCL. Protocol determination circuit 1 determines whether a communication protocol is I2C or SPI, based on majority decision in the plurality of number of times of sampling on chip select signal SS. Specifically, protocol determination circuit 1 determines that the protocol is the SPI when the number of the active logic is larger in the plurality of number of times of sampling on chip select signal SS, and determines that the protocol is the I2C when the number of the inactive logic is larger in the plurality of number of times of sampling on chip select signal SS. Protocol determination circuit 1 latches the determination result as a majority decision signal MAJOR_SS and keeps majority decision signal MAJOR_SS until reset signal RST becomes effective next. Protocol determination circuit 1 outputs majority decision signal MAJOR_SS to SPI communication circuit 2 and I2C communication circuit 4.

SPI communication circuit 2 receives reset signal RST from input terminal Pi1, receives serial clock signal SCL from input terminal Pi2, receives chip select signal SS from input terminal Pi3, receives master-out slave-in signal MOSI or serial data signal SDA from bidirectional buffer 5, and receives majority decision signal MAJOR_SS from protocol determination circuit 1. When majority decision signal MAJOR_SS indicates the SPI (when majority decision signal MAJOR_SS is the active logic), SPI communication circuit 2 outputs an output enable signal and output data to tri-state buffer 3 based on the SPI. When majority decision signal MAJOR_SS indicates the I2C (when majority decision signal MAJOR_SS is the inactive logic), SPI communication circuit 2 controls tri-state buffer 3 such that an output of tri-state buffer 3 has a high impedance. When tri-state buffer 3 receives the output enable signal, tri-state buffer 3 outputs the signal received from SPI communication circuit 2.

Figure 2:
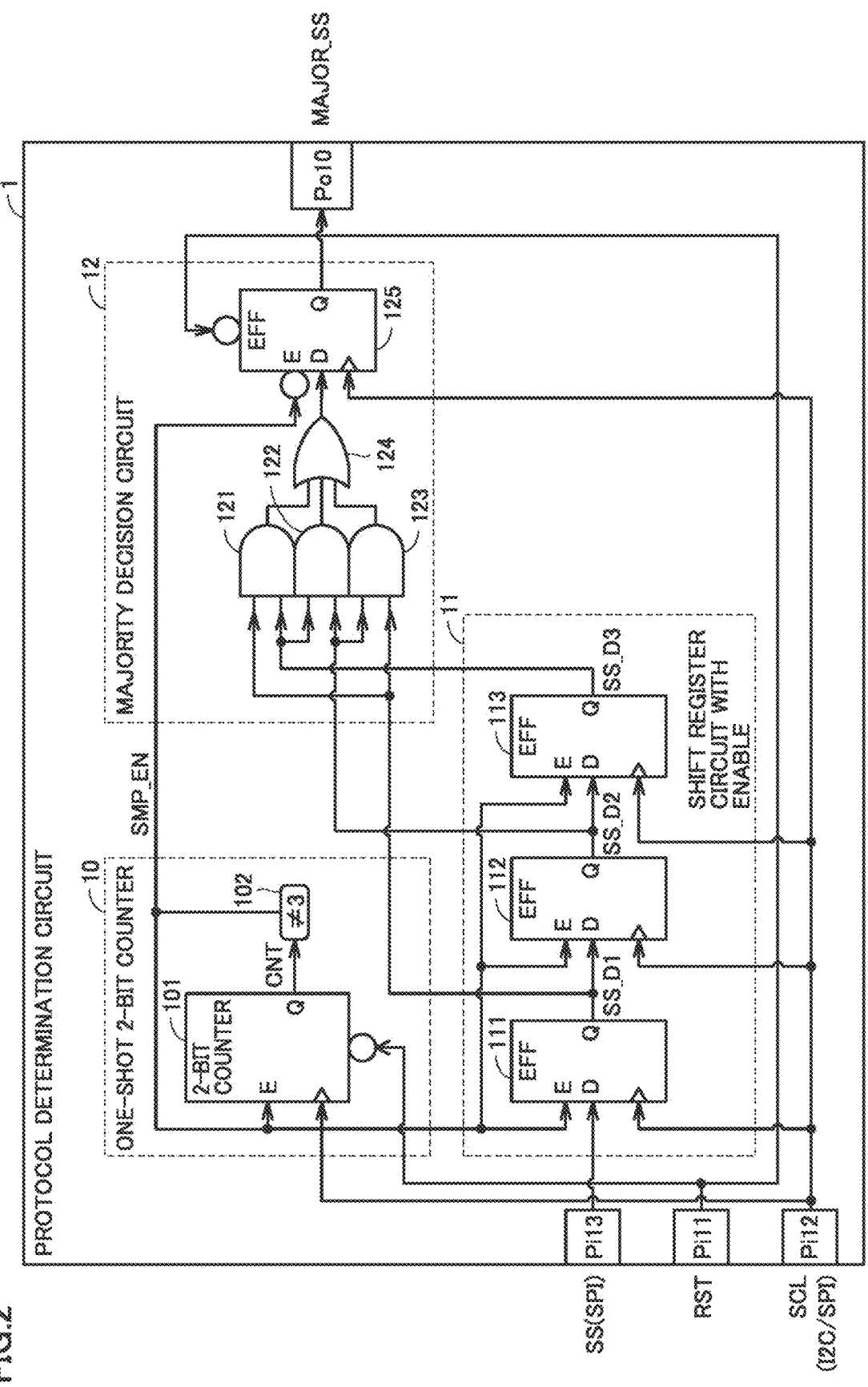
FIG. 2 is a block diagram showing a configuration example of a protocol determination circuit shown in FIG. 1.

I2C communication circuit 4 receives reset signal RST from input terminal Pi1, receives serial clock signal SCL from input terminal Pi2, receives master-out slave-in signal MOSI or serial data signal SDA from bidirectional buffer 5, and receives majority decision signal MAJOR_SS from protocol determination circuit 1. When majority decision signal MAJOR_SS indicates the I2C, I2C communication circuit 4 outputs an output enable signal to bidirectional buffer 5 based on the I2C. When majority decision signal MAJOR_SS indicates the SPI, I2C communication circuit 4 controls bidirectional buffer 5 such that bidirectional buffer 5 outputs master-out slave-in signal MOSI received from input/output terminal Pio. Low is input to bidirectional buffer 5 as a fixed value in order to comply with the I/O buffer standard of the I2C. FIG. 2 is a block diagram showing a configuration example of protocol determination circuit 1 shown in FIG. 1. As shown in FIG. 2, protocol determination circuit 1 includes input terminals Pi11, Pi12 and Pi13, an output terminal Po10, a one-shot 2-bit counter 10, a shift register circuit with enable 11 (sampling circuit), and a majority decision circuit 12. Although the configuration example of protocol determination circuit 1 when the number of times of sampling on chip select signal SS is three is described with reference to FIG. 2, the number of times of sampling on chip select signal SS may only be a plurality of number of times and is not limited to three.

As shown in FIG. 2, input terminal Pi11 receives reset signal RST. Input terminal Pi12 receives serial clock signal SCL. Input terminal Pi13 receives chip select signal SS. Output terminal Po10 outputs majority decision signal MAJOR_SS.

One-shot 2-bit counter 10 includes a 2-bit counter 101 and a comparator 102. 2-bit counter 101 receives reset signal RST from input terminal Pi11, receives serial clock signal SCL from input terminal Pi12, and receives a sampling enable signal SMP_EN from comparator 102. 2-bit counter 101 initializes a count signal CNT to 0 during a time period in which reset signal RST is Low. 2-bit counter 101 counts up count signal CNT at the rising of serial clock signal SCL. 2-bit counter 101 outputs count signal CNT to comparator 102. When count signal CNT is not 3, comparator 102 outputs sampling enable signal SMP_EN as High. When count signal CNT is 3, comparator 102 outputs sampling enable signal SMP_EN as Low. When sampling enable signal SMP_EN is Low, 2-bit counter 101 stops the count operation on count signal CNT.

Shift register circuit with enable 11 includes flip-flop circuits with enable 111, 112 and 113. Flip-flop circuit with enable 111 receives serial clock signal SCL from input terminal Pi12, receives chip select signal SS from input terminal Pi13, and receives sampling enable signal SMP_EN from one-shot 2-bit counter 10. When sampling enable signal SMP_EN is High, flip-flop circuit with enable 111 samples a value of chip select signal SS at the rising of serial clock signal SCL and outputs the value to flip-flop circuit with enable 112 and majority decision circuit 12 as a chip select signal SS_D1. When sampling enable signal SMP_EN is Low, flip-flop circuit with enable 111 stops the sampling operation on chip select signal SS and keeps the value of chip select signal SS_D1. The value of chip select signal SS_D1 kept by flip-flop circuit with enable 111 when sampling enable signal SMP_EN is Low is a value of chip select signal SS sampled by flip-flop circuit with enable 111 for the third time. Flip-flop circuit with enable 112 receives serial clock signal SCL from input terminal Pi12, receives chip select signal SS_D1 from flip-flop circuit with enable 111, and receives sampling enable signal SMP_EN from one-shot 2-bit counter 10. When sampling enable signal SMP_EN is High, flip-flop circuit with enable 112 samples a value of chip select signal SS_D1 at the rising of serial clock signal SCL and outputs the value to flip-flop circuit with enable 113 and majority decision circuit 12 as a chip select signal SS_D2. When sampling enable signal SMP_EN is Low, flip-flop circuit with enable 112 stops the sampling operation on chip select signal SS_D1 and keeps the value of chip select signal SS_D2. The value of chip select signal SS_D2 kept by flip-flop circuit with enable 112 when sampling enable signal SMP_EN is Low is a value of chip select signal SS sampled by flip-flop circuit with enable 111 for the second time.

Flip-flop circuit with enable 113 receives serial clock signal SCL from input terminal Pi12, receives chip select signal SS_D2 from flip-flop circuit with enable 112, and receives sampling enable signal SMP_EN from one-shot 2-bit counter 10. When sampling enable signal SMP_EN is High, flip-flop circuit with enable 113 samples a value of chip select signal SS_D2 at the rising of serial clock signal SCL and outputs the value to majority decision circuit 12 as a chip select signal SS_D3. When sampling enable signal SMP_EN is Low, flip-flop circuit with enable 113 stops the sampling operation on chip select signal SS_D2 and keeps the value of chip select signal SS_D3. The value of chip select signal SS_D3 kept by flip-flop circuit with enable 113 when sampling enable signal SMP_EN is Low is a value of chip select signal SS sampled by flip-flop circuit with enable 111 for the first time.

Majority decision circuit 12 includes AND circuits 121, 122 and 123, an OR circuit 124, and a flip-flop circuit with enable 125. AND circuit 121 receives chip select signals SS_D1 and SS_D3 from flip-flop circuits with enable 111 and 113, respectively, and outputs a logical product of chip select signals SS_D1 and SS_D3 to OR circuit 124. AND circuit 122 receives chip select signals SS_D3 and SS_D2 from flip-flop circuits with enable 113 and 112, respectively, and outputs a logical product of chip select signals SS_D3 and SS_D2 to OR circuit 124. AND circuit 123 receives chip select signals SS_D2 and SS_D1 from flip-flop circuits with enable 112 and 111, respectively, and outputs a logical product of chip select signals SS_D2 and SS_D1 to OR circuit 124. OR circuit 124 outputs a logical sum of the output signals from AND circuits 121 to 123 to flip-flop circuit with enable 125. The logical sum is the active logic when two or more (majority) of chip select signals SS_D1 to SS_D3 are active logic, and is the inactive logic when two or more (majority) of chip select signals SS_D1 to SS_D3 are inactive logic.

Flip-flop circuit with enable 125 receives the output signal from OR circuit 124, receives sampling enable signal SMP_EN from one-shot 2-bit counter 10, receives reset signal RST from input terminal Pi11, and receives serial clock signal SCL from input terminal Pi12. When sampling enable signal SMP_EN is Low, flip-flop circuit with enable 125 samples a value of the output signal from OR circuit 124 at the rising of serial clock signal SCL and outputs the value to output terminal Po10 as majority decision signal MAJOR_SS. When sampling enable signal SMP_EN is High, flip-flop circuit with enable 125 stops the sampling operation on the value of the output signal from OR circuit 124.

By setting the number of times of sampling on chip select signal SS to the odd number of times, either the active logic or the inactive logic absolutely makes up a majority in the sampling result, which can make the configuration of protocol switching circuit 100 and the control of protocol switching circuit 100 simple. The number of times of sampling on chip select signal SS may be the even number of times. When the active logic and the inactive logic are identical in number in the sampling result, protocol determination circuit 1 outputs an output signal (High) indicating a protocol determination error to a not-shown control circuit (e.g., microcomputer) of protocol switching circuit 100. When the control circuit receives the protocol determination error, the control circuit again performs the control of protocol switching circuit 100 from setting reset signal RST to Low, and again determines the communication protocol.

Figure 3:
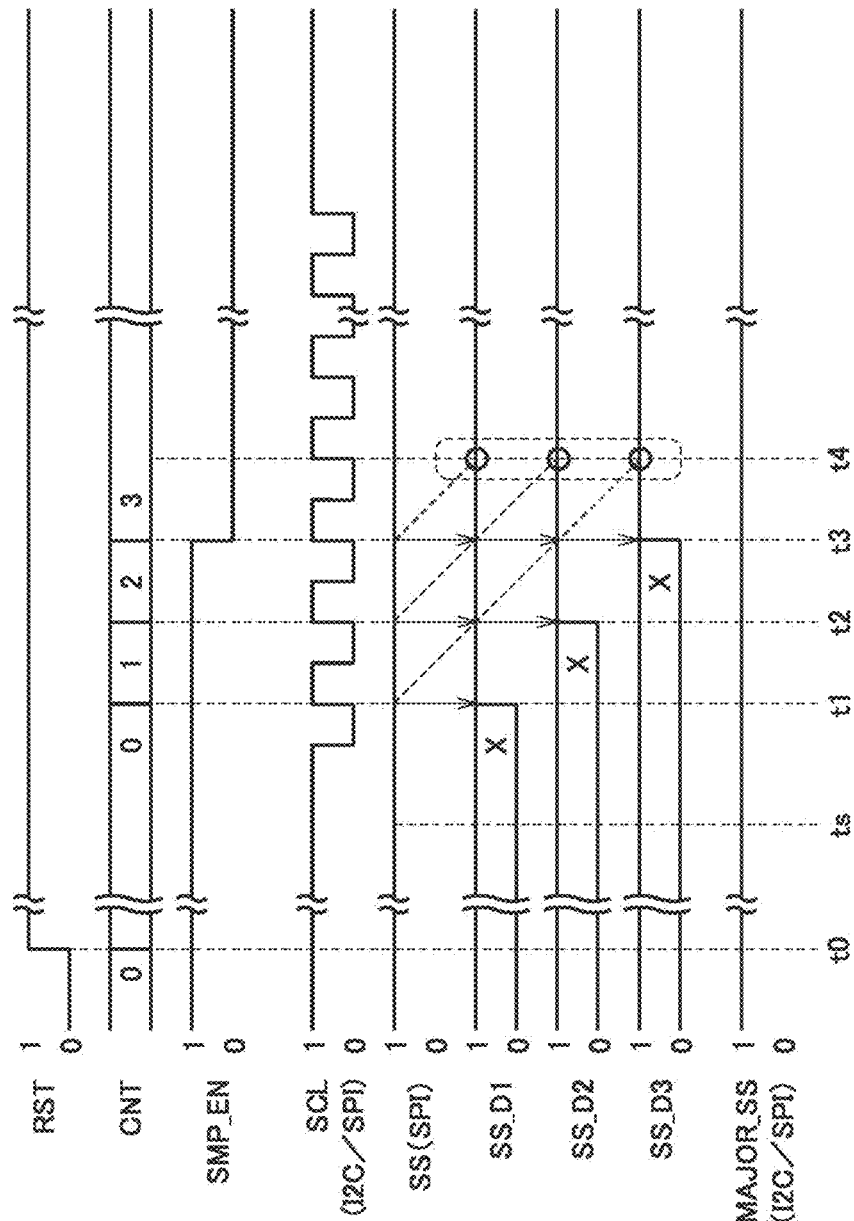
FIG. 3 is a time chart, in the first embodiment, of each signal shown in FIGS. 1 and 2, when I2C communication is selected in a chip select signal.

FIG. 3 is a time chart, in the first embodiment, of each signal shown in FIGS. 1 and 2 when I2C communication is selected in chip select signal SS. As shown in FIG. 3, reset signal RST starts from Low indicating a reset state, and at time t0, makes transition to High indicating a reset cancellation state. Count signal CNT is initialized to 0 in a time period up to time to. Sampling enable signal SMP_EN starts from High. Serial clock signal SCL has an intermittent clock waveform. That is, serial clock signal SCL forms a clock waveform that alternately repeats High and Low at a predetermined cycle during serial communication, based on I2C and SPI communication standards, and maintains High during non-communication.

After first communication start time ts subsequent to time to, chip select signal SS is set to inactive logic. Chip select signal SS is sampled three times at times t1, t2 and t3 that are continuous rising timings of serial clock signal SCL, and is kept at chip select signal SS_D1. Count signal CNT is incremented from 0 to 1 at time t1, is incremented from 1 to 2 at time t2, and is incremented from 2 to 3 at time t3. Sampling enable signal SMP_EN makes transition from High to Low at time t3.

The values of chip select signal SS_D1 at times t1 and t2 are kept at chip select signal SS_D2 at times t2 and t3, respectively. The value of chip select signal SS_D2 at time t2 is kept at chip select signal SS_D3 at time t3. At time t4, which is the rising timing subsequent to time t3 in serial clock signal SCL and at which sampling enable signal SMP_EN is Low, majority decision signal MAJOR_SS is set to a value of a majority of chip select signals SS_D1 to SS_D3. Majority decision signal MAJOR_SS is latched and kept until reset signal RST enters the reset state (Low) next. In FIG. 3, each of chip select signals SS_D1 to SS_D3 at time t4 is High, and thus, majority decision signal MAJOR_SS is set to High.

Figure 4:
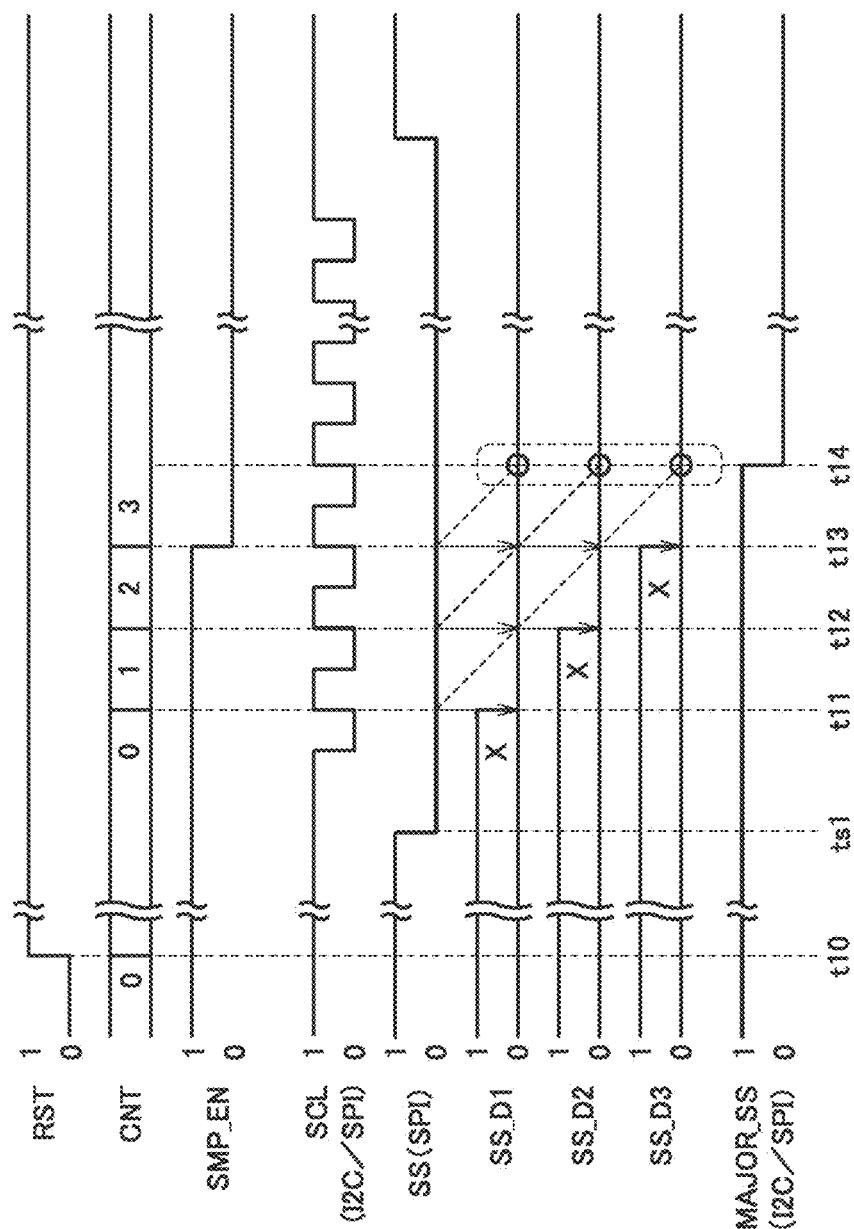
FIG. 4 is a time chart, in the first embodiment, of each signal shown in FIGS. 1 and 2, when SPI communication is selected in the chip select signal.

FIG. 4 is a time chart, in the first embodiment, of each signal shown in FIGS. 1 and 2 when SPI communication is selected in chip select signal SS. As shown in FIG. 4, reset signal RST starts from Low indicating the reset state, and at time t10, makes transition to High indicating the reset cancellation state. Count signal CNT is initialized to 0 in a time period up to time t10.

After first communication start time ts1 subsequent to time t10, chip select signal SS is set to active logic. Chip select signal SS is sampled three times at times t11, t12 and t13 that are continuous rising timings of serial clock signal SCL, and is kept at chip select signal SS_D1. Count signal CNT is incremented from 0 to 1 at time t11, is incremented from 1 to 2 at time t12, and is incremented from 2 to 3 at time t13. Sampling enable signal SMP_EN makes transition from High to Low at time t13.

The values of chip select signal SS_D1 at times t11 and t12 are kept at chip select signal SS_D2 at times t12 and t13, respectively. The value of chip select signal SS_D2 at time t12 is kept at chip select signal SS_D3 at time t13. At time t14, which is the rising timing subsequent to time t13 in serial clock signal SCL and at which sampling enable signal SMP_EN is Low, majority decision signal MAJOR_SS is set to a value of a majority of chip select signals SS_D1 to SS_D3. In FIG. 4, each of chip select signals SS_D1 to SS_D3 at time t14 is Low, and thus, majority decision signal MAJOR_SS is set to Low.

In protocol determination circuit 1, even when the sampling result is reversed from an actual value of chip select signal SS in certain sampling of the plurality of number of times of sampling due to superimposition of noise on chip select signal SS, the actual value of chip select signal SS is set as majority decision signal MAJOR_SS if the actual value of chip select signal SS is sampled the majority number of times or more. In addition, after the value of chip select signal SS is set as majority decision signal MAJOR_SS in the first communication, majority decision signal MAJOR_SS is maintained until the reset signal enters the reset state. Therefore, even when chip select signal SS is reversed from the actual value in the second and subsequent communication due to noise, communication based on the communication protocol corresponding to the actual value of chip select signal SS can be continued.

As described above, the protocol determination circuit and the protocol switching circuit according to the first embodiment make it possible to improve noise immunity of the protocol determination circuit that determines a communication protocol between circuits.

Second Embodiment

In the I2C communication standard, serial clock signal SCL is driven by an open drain buffer. The High level of serial clock signal SCL is implemented when a potential of serial clock signal SCL is pulled up by a resistance of the open drain buffer having a high impedance. Therefore, a slew rate at the rising edge of serial clock signal SCL becomes low and a time period during which the potential of serial clock signal SCL is near a threshold value becomes long. As a result, chattering caused by noise is likely to occur at the rising timing of serial clock signal SCL. In contrast, in the Low level of serial clock signal SCL, the open drain buffer is driven in the Low level. Therefore, the slew rate at the falling edge becomes high and the time period during which the potential of serial clock signal SCL is near the threshold value becomes short. As a result, chattering caused by noise is less likely to occur at the falling timing of serial clock signal SCL.

Accordingly, in a second embodiment, chip select signal SS is sampled at the falling timing of serial clock signal SCL. In the second embodiment, FIGS. 3 and 4 in the first embodiment are replaced with FIGS. 5 and 6. According to the second embodiment, since chip select signal SS is sampled at the timing when chattering caused by noise is less likely to occur than in the first embodiment, noise immunity of a protocol determination circuit that determines a communication protocol between circuits can be further improved as compared with the first embodiment.

Figure 5:
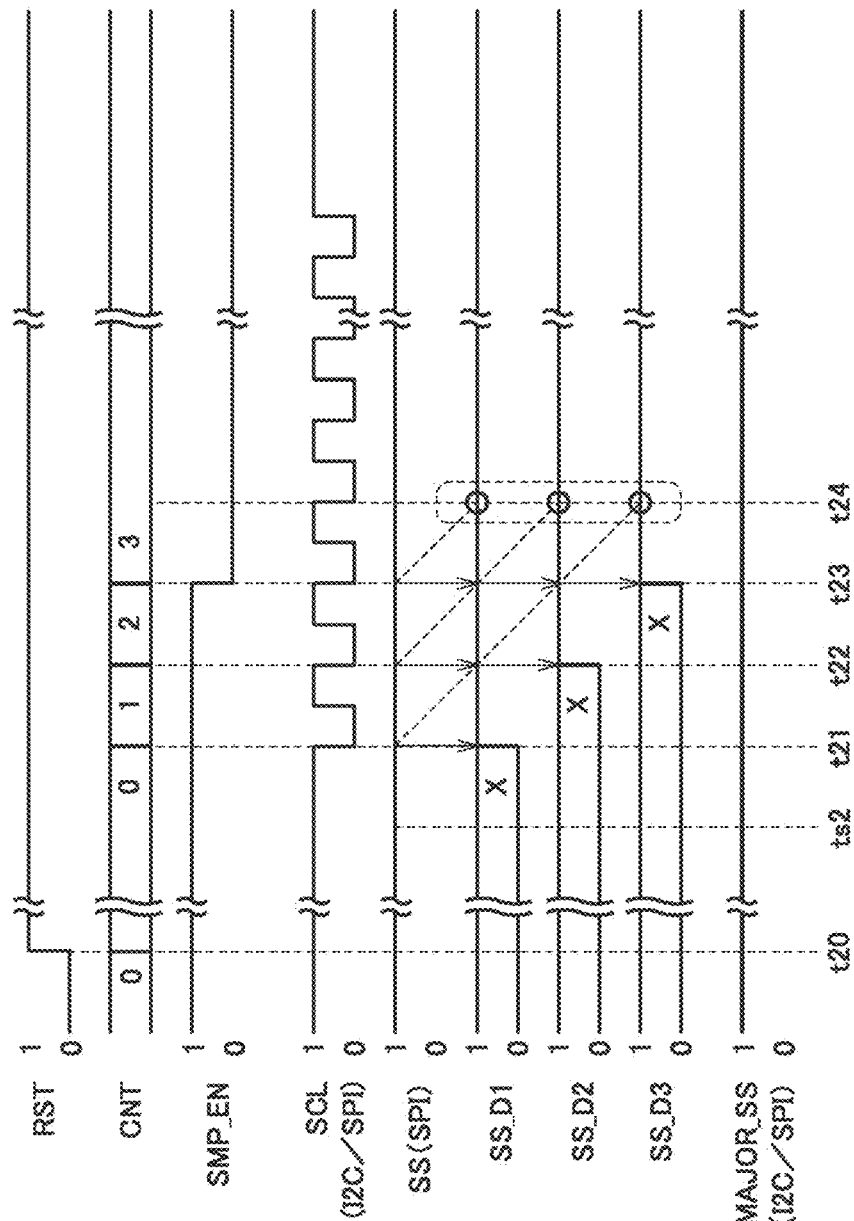
FIG. 5 is a time chart, in a second embodiment, of each signal shown in FIGS. 1 and 2, when I2C communication is selected in a chip select signal.

FIG. 5 is a time chart, in the second embodiment, of each signal shown in FIGS. 1 and 2 when I2C communication is selected in chip select signal SS. As shown in FIG. 5, reset signal RST starts from Low indicating the reset state, and at time t20, makes transition to High indicating the reset cancellation state. Count signal CNT is initialized to 0 in a time period up to time t20.

After first communication start time ts2 subsequent to time t20, chip select signal SS is set to inactive logic. Chip select signal SS is sampled three times at times t21, t22 and t23 that are continuous falling timings of serial clock signal SCL, and is kept at chip select signal SS_D1. Count signal CNT is incremented from 0 to 1 at time t21, is incremented from 1 to 2 at time t22, and is incremented from 2 to 3 at time t23. Sampling enable signal SMP_EN makes transition from High to Low at time t23.

The values of chip select signal SS_D1 at times t21 and t22 are kept at chip select signal SS_D2 at times t22 and t23, respectively. The value of chip select signal SS_D2 at time t22 is kept at chip select signal SS_D3 at time t23. At time t24, which is the falling timing subsequent to time t23 in serial clock signal SCL and at which sampling enable signal SMP_EN is Low, majority decision signal MAJOR_SS is set to a value of a majority of chip select signals SS_D1 to SS_D3. In FIG. 5, each of chip select signals SS_D1 to SS_D3 at time t24 is High, and thus, majority decision signal MAJOR_SS is set to High.

Figure 6:
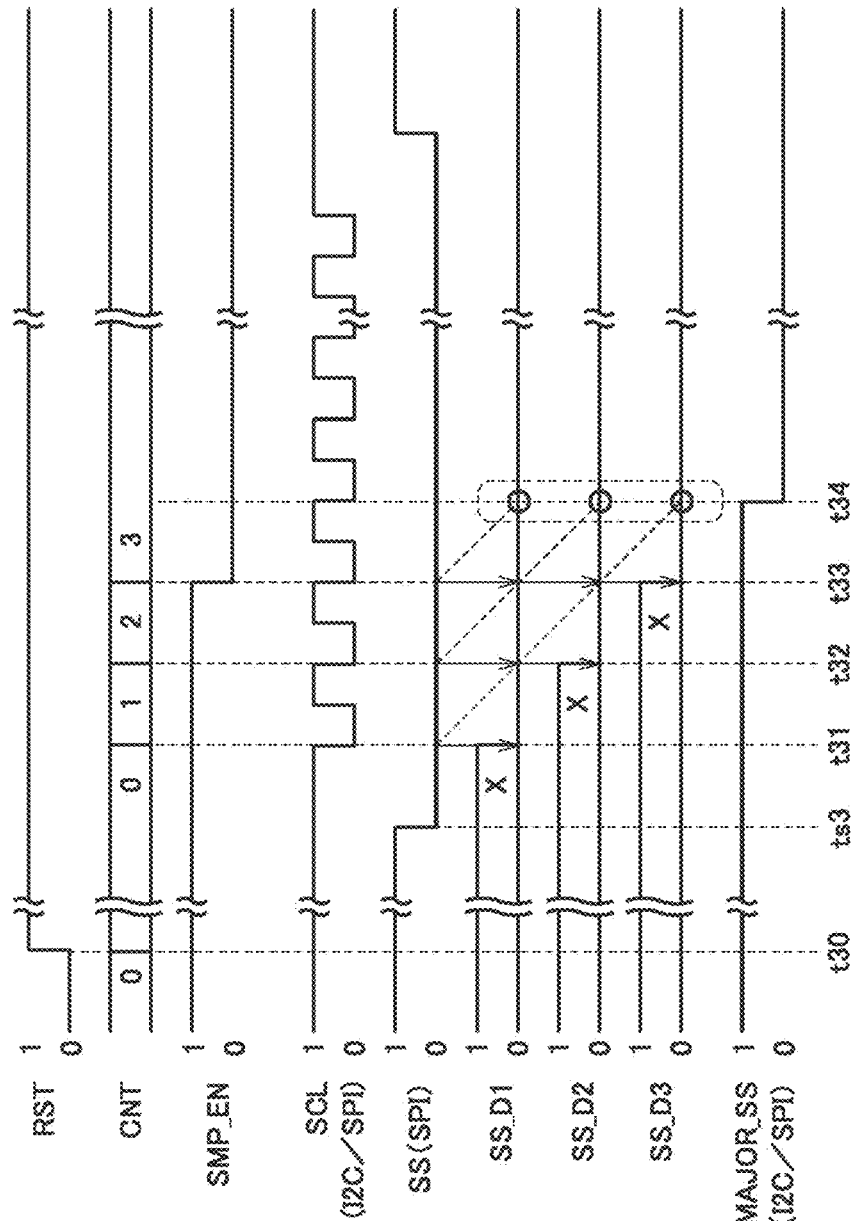
FIG. 6 is a time chart, in the second embodiment, of each signal shown in FIGS. 1 and 2, when SPI communication is selected in the chip select signal.

FIG. 6 is a time chart, in the second embodiment, of each signal shown in FIGS. 1 and 2 when SPI communication is selected in chip select signal SS. As shown in FIG. 6, reset signal RST starts from Low indicating the reset state, and at time t30, makes transition to High indicating the reset cancellation state. Count signal CNT is initialized to 0 in a time period up to time t30.

After first communication start time ts3 subsequent to time t30, chip select signal SS is set to active logic. Chip select signal SS is sampled three times at times t31, t32 and t33 that are continuous falling timings of serial clock signal SCL, and is kept at chip select signal SS_D1. Count signal CNT is incremented from 0 to 1 at time t31, is incremented from 1 to 2 at time t32, and is incremented from 2 to 3 at time t33. Sampling enable signal SMP_EN makes transition from High to Low at time t33.

The values of chip select signal SS_D1 at times t31 and t32 are kept at chip select signal SS_D2 at times t32 and t33, respectively. The value of chip select signal SS_D2 at time t32 is kept at chip select signal SS_D3 at time t33. At time t34, which is the falling timing subsequent to time t33 in serial clock signal SCL and at which sampling enable signal SMP_EN is Low, majority decision signal MAJOR_SS is set to a value of a majority of chip select signals SS_D1 to SS_D3. In FIG. 6, each of chip select signals SS_D1 to SS_D3 at time t34 is Low, and thus, majority decision signal MAJOR_SS is set to Low.

As described above, the protocol determination circuit and the protocol switching circuit according to the second embodiment make it possible to further improve noise immunity of the protocol determination circuit that determines a communication protocol between circuits, as compared with the first embodiment.

When a plurality of I2C slave devices are connected to the same communication line, a unique slave address needs to be set for each of the plurality of I2C slave devices. Therefore, it is desirable to allow selection of a slave address in I2C communication. Accordingly, a configuration in which an I2C slave device selection function is implemented in addition to the protocol determination function in the first and second embodiments will be described in third, fourth and fifth embodiments.

Third Embodiment

Figure 7:
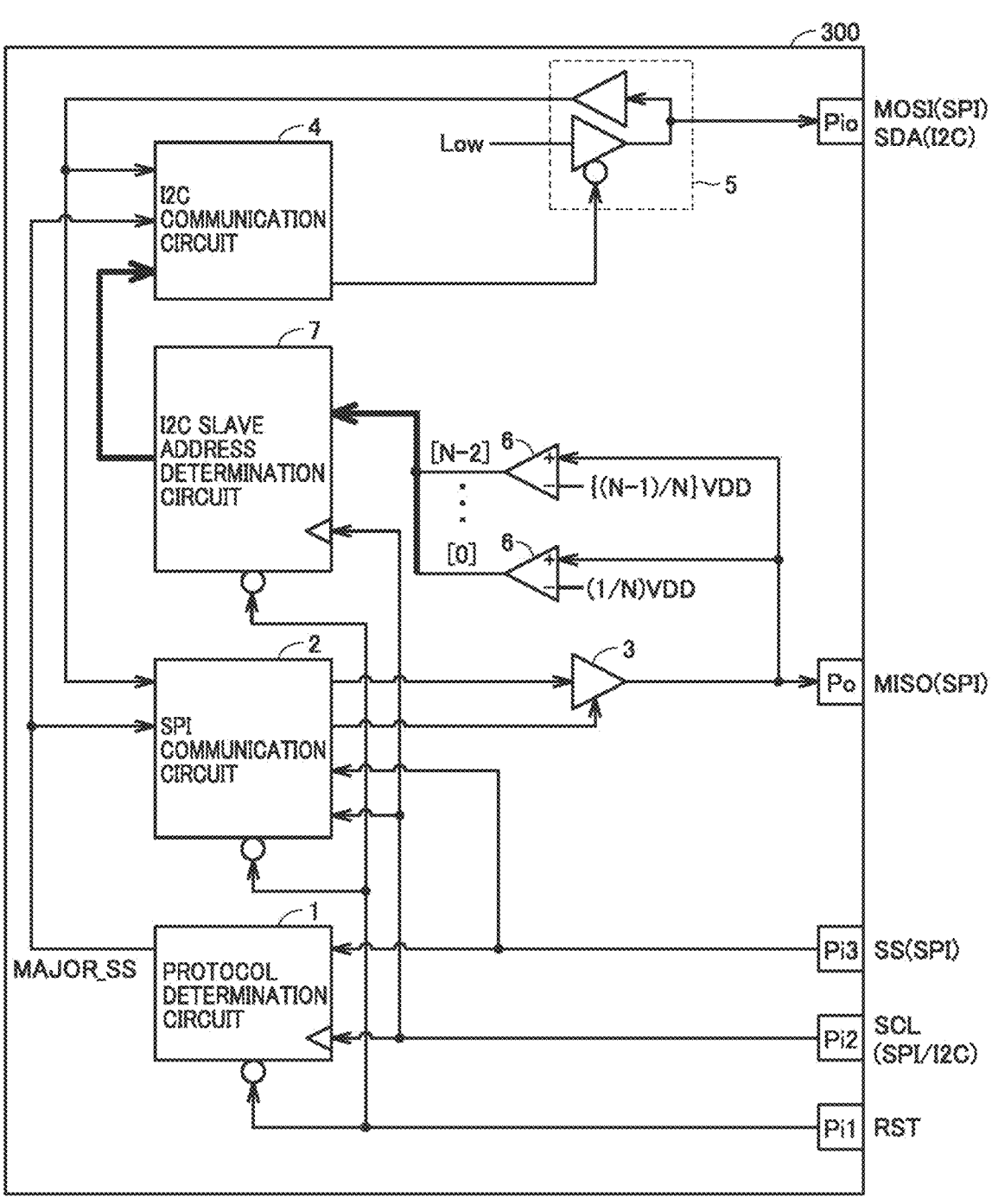
FIG. 7 is a block diagram showing a configuration example of a protocol switching circuit according to a third embodiment.

FIG. 7 is a block diagram showing a configuration example of a protocol switching circuit 300 according to the third embodiment. In the configuration of protocol switching circuit 300, (N−1) (N is a natural number equal to or more than 2) comparators 6 and an I2C slave address determination circuit 7 are added to the configuration of protocol switching circuit 100 shown in FIG. 1. Since the remaining configuration of protocol switching circuit 300 is the same as the configuration of protocol switching circuit 100, description of the same configuration will not be repeated.

As shown in FIG. 7, output terminal Po is connected to a non-inverting input terminal (+) (first input terminal) of each of (N−1) comparators 6. Master-in slave-out signal MISO is input from output terminal Po to the non-inverting input terminal of comparator 6. Master-in slave-out signal MISO (output terminal Po) has a high impedance when I2C communication is selected in chip select signal SS (in I2C communication). Voltages of VDD×(1/N), VDD×(2/N), . . . , VDD×(N−1)/N are input to inverting input terminals (−) (second input terminals) of (N−1) comparators, respectively, where VDD represents a voltage of a power supply. That is, in I2C communication, a voltage that is K/N times as high as power supply voltage VDD is input to an inverting input terminal of a K-th (K is a natural number equal to or more than 1 and equal to or less than (N−1)) comparator 6 included in (N−1) comparators 6.

The outputs of (N−1) comparators 6 are input to I2C slave address determination circuit 7. I2C slave address determination circuit 7 outputs a specific slave address corresponding to the outputs of (N−1) comparators 6 to I2C communication circuit 4. I2C communication circuit 4 communicates with a slave device identified by the specific slave address.

I2C slave address determination circuit 7 has the same configuration as the configuration of protocol determination circuit 1. By making the configuration of I2C slave address determination circuit 7 the same as the configuration of protocol determination circuit 1, noise immunity of I2C slave address determination circuit 7 can be improved.

According to protocol switching circuit 300, the specific slave address in I2C communication can be selected from N different address values in accordance with the voltage of master-in slave-out signal MISO (output terminal Po) in I2C communication. In addition, by using, for slave address selection control, master-in slave-out signal MISO that is not used in I2C communication, the I2C slave address selection function can be implemented inexpensively without increasing the number of control terminals.

As described above, the protocol determination circuit and the protocol switching circuit according to the third embodiment make it possible to improve noise immunity of the protocol determination circuit that determines a communication protocol between circuits.

Fourth Embodiment

Figure 8:
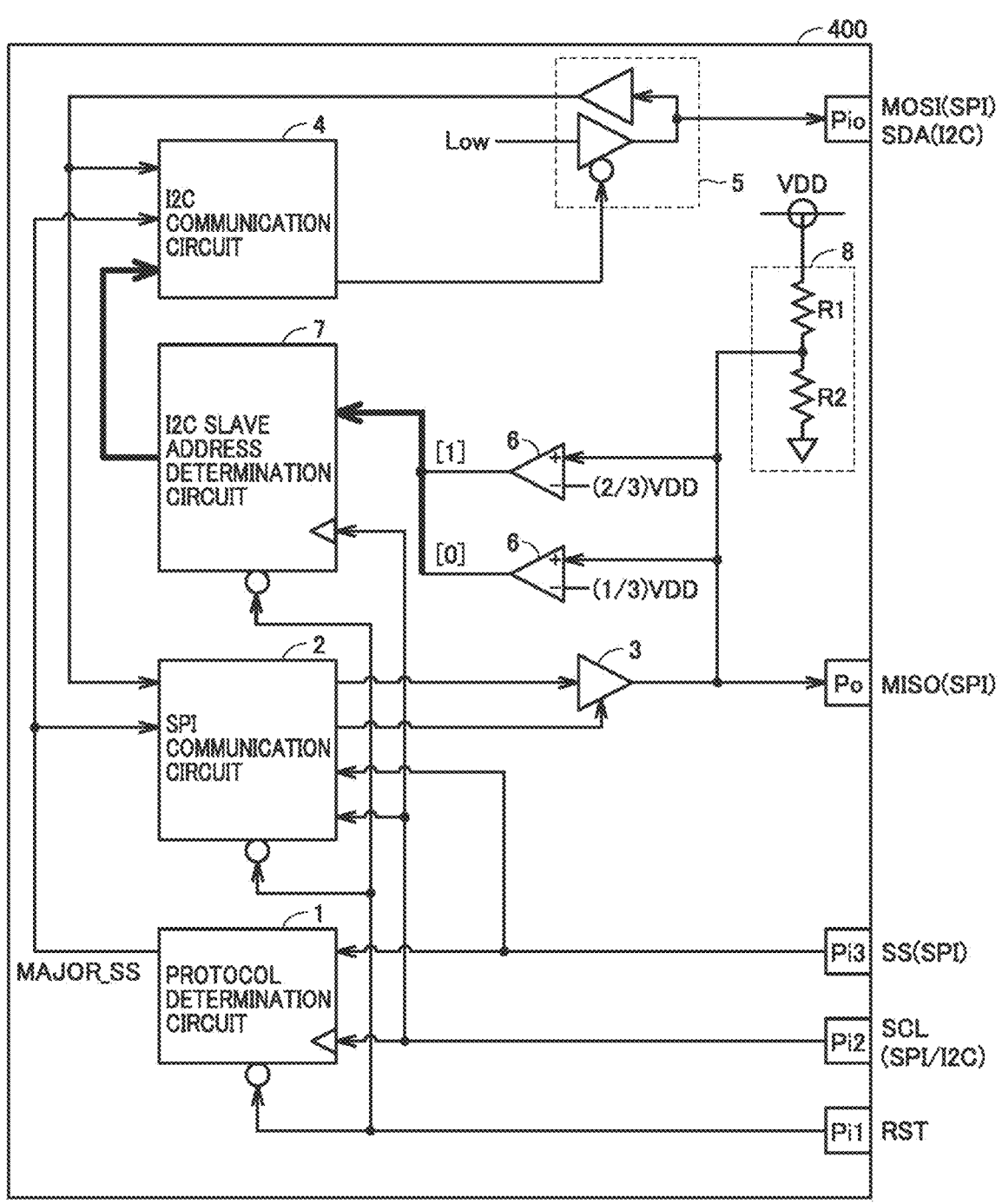
FIG. 8 is a block diagram showing a configuration example of a protocol switching circuit according to a fourth embodiment.

FIG. 8 is a block diagram showing a configuration example of a protocol switching circuit 400 according to the fourth embodiment. In the configuration of protocol switching circuit 400, N is equal to 3 in the configuration of protocol switching circuit 300 shown in FIG. 7, and an internal bias circuit 8 is added to the configuration of protocol switching circuit 300. Since the remaining configuration of protocol switching circuit 400 is the same as the configuration of protocol switching circuit 300, description of the same configuration will not be repeated. N is not limited to 3.

As shown in FIG. 8, internal bias circuit 8 includes resistances R1 and R2 connected in series between the power supply and a ground point. A connection point that connects resistances R1 and R2 is connected to each of non-inverting input terminals of two comparators 6. When the impedance of the master-in slave-out signal MISO terminal is open, a voltage of the connection point is VDD/2. That is, when the impedance of the master-in slave-out signal MISO terminal is open, internal bias circuit 8 outputs, to each of the non-inverting input terminals of two comparators 6, a voltage that is a half of power supply voltage VDD.

According to protocol switching circuit 400, by setting a state of the impedance of master-in slave-out signal MISO to any one of a supply fault, open and a ground fault, the slave address in I2C communication can be selected from three different addresses. Since addition of external components to protocol switching circuit 400 is unnecessary, the slave address selection function in I2C communication can be implemented inexpensively.

In addition, in the configuration of protocol switching circuit 400 shown in FIG. 8, a resistance element is unnecessary as an external component when N=3 in protocol switching circuit 300 shown in FIG. 7. Generally, an output of internal bias circuit 8 needs to be an average value of voltages of inverting input terminals of a plurality of comparators 6 adjacent to each other. That is, internal bias circuit 8 needs to output a voltage obtained by multiplying (K+0.5)/N by power supply voltage VDD (a voltage that is (K+0.5)/N times as high as power supply voltage VDD), (K+0.5)/N being an average value of K/N and (K+1)/N. When the state of the impedance of master-in slave-out signal MISO is set to a state other than a supply fault, open and a ground fault in a configuration other than protocol switching circuit 400, a resistance element is necessary as an external component.

As described above, the protocol determination circuit and the protocol switching circuit according to the fourth embodiment make it possible to improve noise immunity of the protocol determination circuit that determines a communication protocol between circuits.

Fifth Embodiment

Figure 9:
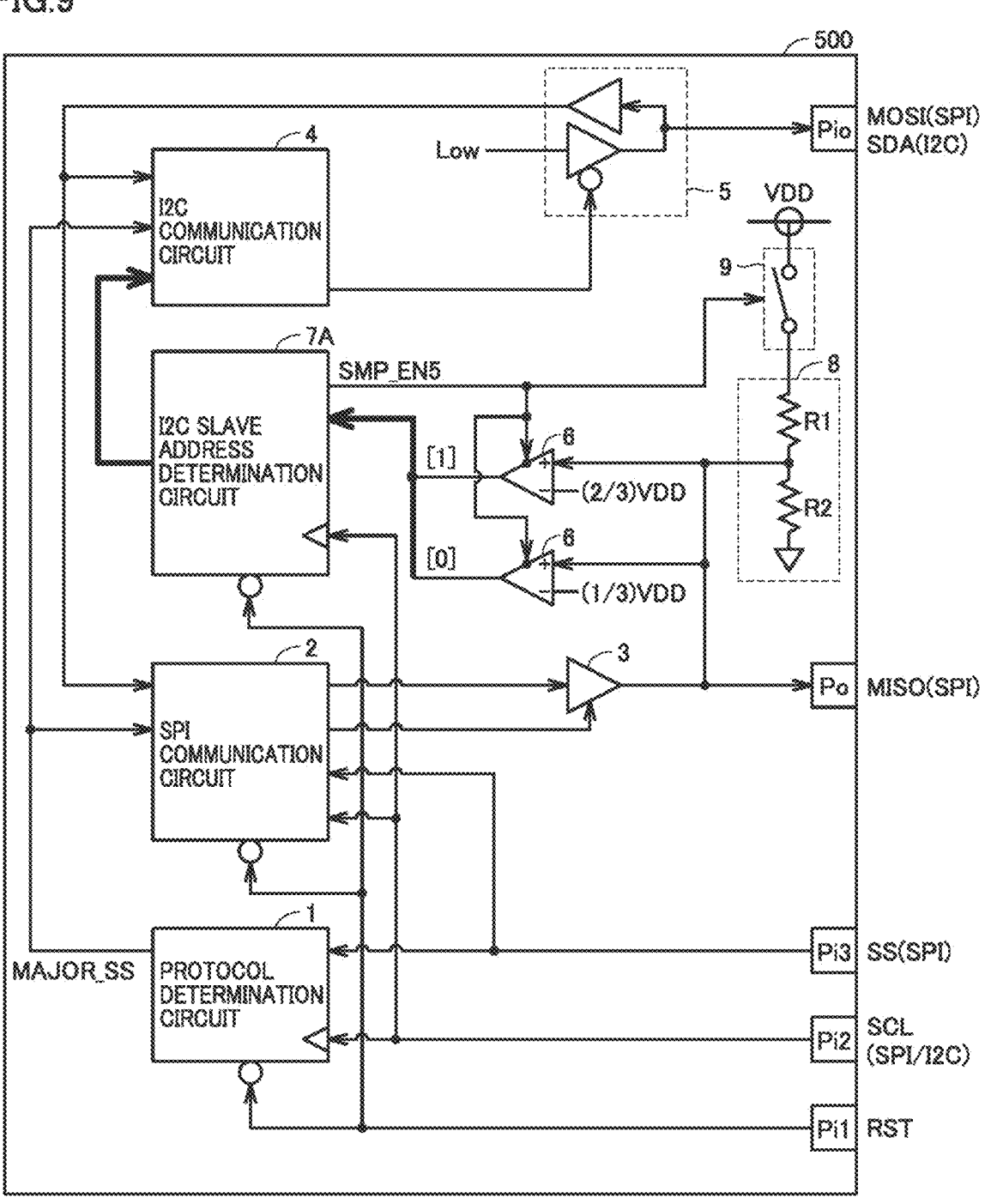
FIG. 9 is a block diagram showing a configuration example of a protocol switching circuit according to a fifth embodiment.

FIG. 9 is a block diagram showing a configuration example of a protocol switching circuit 500 according to the fifth embodiment. In the configuration of protocol switching circuit 500, I2C slave address determination circuit 7 shown in FIG. 8 is replaced with an I2C slave address determination circuit 7A and a switch 9 is added. Since the remaining configuration of protocol switching circuit 500 is the same as the configuration of protocol switching circuit 400, description of the same configuration will not be repeated.

As shown in FIG. 9, switch 9 is connected between internal bias circuit 8 and the power supply. I2C slave address determination circuit 7A outputs a sampling enable signal SMP_EN5 to two comparators 6 and switch 9. Sampling enable signal SMP_EN5 indicates a time period for sampling the outputs of two comparators 6.

Protocol switching circuit 500 performs power down control on comparators 6 and internal bias circuit 8 after the sampling time period indicated by sampling enable signal SMP_EN5 ends (SMP_EN5=Low). According to protocol switching circuit 500, the electric power required for the slave address selection function in I2C communication can be reduced.

As described above, the protocol determination circuit and the protocol switching circuit according to the fifth embodiment make it possible to improve noise immunity of the protocol determination circuit that determines a communication protocol between circuits.

The embodiments disclosed herein are also planned to be implemented in appropriate combination within a non-contradictory range. It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

<div align="center">REFERENCE SIGNS LIST</div>

1 protocol determination circuit; 2, 4 communication circuit; 3 tri-state buffer; 5 bidirectional buffer; 6 comparator; 7, 7A I2C slave address determination circuit; 8 bias circuit; 9 switch; 10 one-shot 2-bit counter; 11 shift register circuit with enable; 12 majority decision circuit; 100 protocol switching circuit; 101 2-bit counter; 102 comparator; 111 to 113, 125 flip-flop circuit with enable; 121 to 123 AND circuit; 124 OR circuit; CNT count signal; MAJOR_SS majority decision signal; MISO master-in slave-out signal; MOSI master-out slave-in signal; Pi1 to Pi3, Pi11 to Pi13 input terminal; Pio input/output terminal; Po, Po10 output terminal; RST reset signal; SCL serial clock signal; SDA serial data signal; SMP_EN, SMP_EN5 sampling enable signal; SS chip select signal; VDD power supply voltage; t0 to t4, t10 to t14, t20 to t24, t30 to t34 time; ts, ts1 to ts3 communication start time.

The invention claimed is:

1. A protocol determination circuit comprising:
a sampling circuit that performs a plurality of number of times of sampling on a protocol specifying signal, the protocol specifying signal being any one of a first value indicating a first communication protocol and a second value indicating a second communication protocol; and
a majority decision circuit that outputs a majority decision signal and receives a reset signal, the majority decision signal indicating a communication protocol corresponding to a value sampled majority number of times in the plurality of number of times of sampling, wherein
the majority decision circuit determines any one of the value indicating the first communication protocol and the value indicating the second communication protocol from a value sampled in the plurality of number of times of sampling in first communication after the reset signal is cleared, and
wherein the majority decision circuit determines that the protocol specifying signal is the first communication protocol when a number of the first value is larger than a number of the second value in the plurality of number of times of sampling and determines that the protocol specifying signal is the second communication protocol when a number of the second value is larger than a number of the first value in the plurality of number of times of sampling.

2. The protocol determination circuit according to claim 1, wherein
the sampling circuit performs each of the plurality of number of times of sampling at a timing when a clock signal alternately repeating the first value and the second value at a predetermined cycle changes from the second value to the first value, the second value being larger than the first value.

3. The protocol determination circuit according to claim 1, wherein
the first communication protocol is I2C, and
the second communication protocol is SPI.

4. A protocol switching circuit comprising:
the protocol determination circuit as recited in claim 1;

a first communication circuit that performs communication based on the first communication protocol when the majority decision signal indicates the first communication protocol; and
a second communication circuit that performs communication based on the second communication protocol when the majority decision signal indicates the second communication protocol.

5. The protocol determination circuit according to claim 3, wherein the protocol specifying signal is a chip select signal, the chip select signal is set to:
the first value in the IC2 communication; and
the second value in the SPI communication.

6. A protocol switching circuit comprising a protocol determination circuit,
the protocol determination circuit comprising:
a sampling circuit that performs a plurality of number of times of sampling on a protocol specifying signal, the protocol specifying signal being any one of a value indicating a first communication protocol and a value indicating a second communication protocol; and
a majority decision circuit that outputs a majority decision signal, the majority decision signal indicating a communication protocol corresponding to a value sampled majority number of times in the plurality of number of times of sampling,
the protocol switching circuit further comprising:
a first communication circuit that performs communication based on the first communication protocol when the majority decision signal indicates the first communication protocol;
a second communication circuit that performs communication based on the second communication protocol when the majority decision signal indicates the second communication protocol;
an output terminal that outputs a master-in slave-out signal from a slave to a master when the majority decision signal indicates the second communication protocol;
(N−1) (N is a natural number equal to or more than 2) comparators; and
a slave address determination circuit, wherein
the output terminal is connected to a first input terminal of each of the (N−1) comparators,
a voltage that is K/N times as high as a voltage of a power supply is input to a second input terminal of a K-th (K is a natural number equal to or more than 1 and equal to or less than (N−1)) comparator included in the (N−1) comparators,
outputs of the (N−1) comparators are input to the slave address determination circuit,
the slave address determination circuit outputs, to the first communication circuit, a specific slave address corresponding to the outputs of the (N−1) comparators, and
the first communication circuit communicates with a slave device identified by the specific slave address.

7. The protocol switching circuit according to claim 6, further comprising
an internal bias circuit connected to the output terminal, wherein
when an impedance of the master-in slave-out signal is open, the internal bias circuit outputs, to the first input terminal of each of the (N−1) comparators, a voltage that is (K+0.5)/N times as high as the voltage of the power supply.

8. The protocol switching circuit according to claim 7, wherein the slave address determination circuit outputs, to the (N−1) comparators and the internal bias circuit, a sampling enable signal indicating a time period for sampling the outputs of the (N−1) comparators, and performs power down control on the (N−1) comparators and the internal bias circuit after the time period ends.

\*   \*   \*   \*   \*